US009511648B2

United States Patent
Gu et al.

(10) Patent No.: US 9,511,648 B2
(45) Date of Patent: *Dec. 6, 2016

(54) VEHICLE HEATER

(71) Applicant: Halla Visteon Climate Control Corp., Daejeon (KR)

(72) Inventors: Jung Sam Gu, Daejeon (KR); Kwang Hun Oh, Daejeon (KR); Young-Ha Jeon, Daejeon (KR); Jun Young Song, Daejeon (KR); Hong-Young Lim, Daejeon (KR)

(73) Assignee: HANON SYSTEMS, Daejeon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/381,623

(22) PCT Filed: Feb. 26, 2013

(86) PCT No.: PCT/KR2013/001507
§ 371 (c)(1),
(2) Date: Aug. 28, 2014

(87) PCT Pub. No.: WO2013/129814
PCT Pub. Date: Sep. 6, 2013

(65) Prior Publication Data
US 2015/0043898 A1 Feb. 12, 2015

(30) Foreign Application Priority Data

Feb. 28, 2012 (KR) .................. 10-2012-0020585
Jul. 9, 2012 (KR) .................. 10-2012-0074487

(51) Int. Cl.
*F24H 3/10* (2006.01)
*H05B 3/24* (2006.01)
(Continued)

(52) U.S. Cl.
CPC .......... *B60H 1/2225* (2013.01); *F24H 3/0429* (2013.01); *F24H 3/0435* (2013.01); *F24H 3/062* (2013.01); *H05B 3/20* (2013.01); *H05B 3/30* (2013.01); *F24H 2250/04* (2013.01); *H05B 3/44* (2013.01); *H05B 2203/023* (2013.01)

(58) Field of Classification Search
None
See application file for complete search history.

(56) References Cited

U.S. PATENT DOCUMENTS 7,667,164 B2  2/2010  Bohlender et al.
8,283,612 B2 * 10/2012  Keite-Telgenbuescher  B60R 1/0602
                                              219/203

(Continued)

FOREIGN PATENT DOCUMENTS

CN  101940060 A       1/2011
IT       1370117 A2 * 12/2003  ........... F24H 3/0405

(Continued)

OTHER PUBLICATIONS

JP 2010-040264, Nakamura et al, "Electric Heater Apparatus," Feb. 2010, partial translation.*

*Primary Examiner* — Joseph M Pelham
(74) *Attorney, Agent, or Firm* — Fraser Clemens Martin & Miller LLC; James D. Miller

(57) ABSTRACT

Provided is a vehicle heater that is capable of being easily manufactured and being miniaturized due to a decrease in a thickness by forming a heat generating part using a first support part (and a second support part) positioned perpendicularly to an air flow direction and having a plate form and is capable of improving heating performance by improving heat exchange performance.

7 Claims, 17 Drawing Sheets

(51) Int. Cl.
*B60H 1/22* (2006.01)
*F24H 3/06* (2006.01)
*H05B 3/30* (2006.01)
*H05B 3/20* (2006.01)
*F24H 3/04* (2006.01)
*H05B 3/44* (2006.01)

(56) References Cited

U.S. PATENT DOCUMENTS

| | | | |
|---|---|---|---|
| 2004/0252986 A1* | 12/2004 | Ito | B60H 1/2225 392/485 |
| 2006/0013574 A1* | 1/2006 | Ito | B60H 1/2225 392/485 |
| 2009/0057295 A1* | 3/2009 | Han | H05B 3/84 219/538 |
| 2009/0139983 A1 | 6/2009 | Luppold et al. | |
| 2009/0194525 A1* | 8/2009 | Lee | H05B 3/145 219/553 |
| 2010/0038356 A1* | 2/2010 | Fukuda | H01C 7/021 219/549 |
| 2010/0282729 A1* | 11/2010 | Taguchi | H05B 3/50 219/202 |
| 2011/0127247 A1* | 6/2011 | Choi | B60H 1/2225 219/202 |
| 2012/0103959 A1 | 5/2012 | Kim et al. | |
| 2012/0118873 A1* | 5/2012 | Erismis | H05B 3/26 219/546 |
| 2014/0008450 A1* | 1/2014 | Gu | B60H 1/034 237/12.3 R |
| 2015/0043898 A1* | 2/2015 | Gu | H05B 3/20 392/360 |

FOREIGN PATENT DOCUMENTS

| | | |
|---|---|---|
| JP | 2007278609 A | 10/2007 |
| JP | 2009-196385 A | 9/2009 |
| JP | 2009255739 A | 11/2009 |
| JP | 2010-040264 A | 2/2010 |
| JP | 2010-091185 A | 4/2010 |
| KR | 20050034997 A | 4/2005 |
| KR | 20100082805 A | 7/2010 |
| KR | 20110136675 A | 12/2011 |
| KR | WO 2014119902 A1 * 8/2014 ............... H05B 3/24 |

* cited by examiner

US 9,511,648 B2

VEHICLE HEATER

CROSS-REFERENCE TO RELATED APPLICATIONS

This application is a United States national phase application based on PCT/KR2013/001507 filed Feb. 26, 2013 which claims the benefit of Korean Patent Application No. KR 10 2012 0020585, filed Feb. 28, 2012 and Korean Patent Application No. KR 10 2012 0074487, filed Jul. 9, 2012. The entire disclosures of the above applications are hereby incorporated herein by reference.

FIELD OF THE INVENTION

The present invention relates to a vehicle heater, and more particularly, to a vehicle heater that is capable of being easily manufactured and being miniaturized due to a decrease in a thickness by forming a heat generating part using a first support part (and a second support part) positioned perpendicularly to an air flow direction and having a plate form and is capable of improving heating performance by improving heat exchange performance.

BACKGROUND OF THE INVENTION

Particularly, a heating means that is in charge of heating an inner portion of the vehicle is configured so that a heat exchange medium for lowering a temperature of an engine heats external air while being circulated in a heater core, thereby heating the inner portion of the vehicle.

However, a diesel engine among engines has high heat exchange efficiency, such that it requires a longer time in heating the heat exchange medium cooling the engine as compared with a gasoline engine at the time of an initial start-up of the vehicle.

Therefore, in the winter, in a vehicle including the diesel engine, the heating of the heat exchange medium after the initial start-up becomes late, such that initial indoor heating performance is deteriorated.

In order to solve the problem as described above, a vehicle air heating type heater having a form in which air blown toward an inner portion of the vehicle is directly heated using various means has been suggested.

The air heating type heater directly heats the air to further improve heating performance. However, a space corresponding to a size of the air heating type heater is occupied in a situation in which it is difficult to secure a sufficient space in the engine room in accordance with the trend toward miniaturization and efficiency improvement, thereby making it possible to hinder the miniaturization.

Particularly, in the case of a cartridge heater using a nichrome wire, it is difficult to control a temperature, there is a risk that the cartridge heater will be overheated when the air is not blown toward the cartridge heater, an insulation problem due to a high voltage may occur, and there is a risk of a fire.

In addition, a vehicle air conditioning apparatus using a positive temperature coefficient (PTC) heater has been suggested in Japanese Patent Laid-Open Publication No. 2009-255739, and the PTC heater according to the related art is shown in FIG. 1.

In FIG. 1, an air flow direction is denoted by an arrow, and the PTC heater shown in FIG. 1 is configured to include heat source parts 11 formed of a PTC element, heat radiating parts 12 contacting the heat source parts 11 to effectively radiate heat, and a housing 20 enclosing and protecting terminal parts, the heat source parts 11, and the heat radiating parts 12.

Although the PTC heater according to the related art may have a partial difference in a detailed structure, the heat source parts are formed in parallel with the air flow direction, such that a formation area of the heat source parts has a direct influence on heat generation performance. Therefore, there is a limitation in decreasing a thickness (air flow direction) of the PTC heater.

Particularly, in the PTC heater, since an electrical problem may occur in the case in which a heat radiating condition is not good, the heat radiating parts (generally, heat radiating fins) should be formed. Therefore, a process of manufacturing and assembling the heat radiating parts is complicated, and entire durability of the PTC heater may be deteriorated in the case in which heat radiation is not effectively performed.

An example of a vehicle air conditioning apparatus using a PTC heater is shown in FIG. 2.

The vehicle air conditioning apparatus shown in FIG. 2 is configured to include an air conditioning case 30 provided with a floor vent 31, a defrost vent 32, and a face vent 33 of which opening degrees are adjusted by the respective doors 31d, 32d, and 33d; an evaporator 41 disposed in the air conditioning case 30 and cooling air; a heater core 42 having a high temperature coolant flowing therein to heat the air; and the PTC heater 43 disposed behind the heater core 42 in an air flow direction.

Here, the PTC heater is disposed so as to maintain a predetermined interval from the heater core. Therefore, an inner space of the air conditioning case is occupied by an amount corresponding to the predetermined interval, thereby making it possible to deteriorate space efficiency.

In addition, in order to prevent a pressure drop of the air and decrease a cost, the PTC heater is mainly positioned at a central region of the heater core in a height direction. Therefore, air passing through upper and lower regions in which the PTC heater is not positioned is moved in a state in which it is not appropriately heated, such that heating performance cannot but be deteriorated.

(A flow of the air moved in a state in which the air is not appropriately heated is denoted by a dotted arrow).

Therefore, development of a heater capable of improving heating performance by improving heat exchange performance in spite of being directly heat-exchanged with air, being miniaturized, being easily controlled, and increasing safety by preventing a problem due to overheating has been demanded.

RELATED ART DOCUMENT

Patent Document (Patent 1) Japanese Patent Laid-Open Publication No. 2009-255739 (entitled "Vehicle Air Conditioning Apparatus and published on Nov. 5, 2009)

SUMMARY OF THE INVENTION

An object of the present invention is to provide a vehicle heater that is capable of being easily manufactured and being miniaturized due to a decrease in a thickness by forming a heat generating part using a first support part (and a second support part) positioned perpendicularly to an air flow direction and having a plate form and is capable of improving heating performance by improving heat exchange performance.

Technical Solution

In one general aspect, a vehicle heater includes: a first support part 100 positioned perpendicularly to an air flow direction, having a plate form, and including a first heat generation region A110 and a first air flowing region A120 provided with a plurality of first hollow parts 101 in which predetermined regions are hollowed; a heat generating part 200 formed in the first heat generation region A110 of the first support part 100 and generating heat; and a housing 400 supporting and fixing one end portions of the first support part 100 and the heat generating part 200.

The first support part 100 and the heat generating part 200 may be formed in a module form, and the number of each of the first heat support parts 100 and the heat generating parts 200 disposed in a height direction may be plural.

The first support part 100 may be provided with a plurality of first heat generation regions A110 and first air flowing regions A120 formed in a height direction.

The vehicle heater may further include a second support part 300 including a second heat generation region A310 corresponding to the first heat generation region A110 of the first support part 100 and a second air flowing region A320 adjacent to the second heat generation region A310, provided with a plurality of second hollow parts 301 in which predetermined regions are hollowed, and corresponding to the first air flowing region A120 of the first support part 100 so as to support both sides of the heat generating part 200 together with the first support part 100.

Hollow regions of the first hollow parts 101 and hollow regions of the second hollow parts 301 may be overlapped with each other in predetermined regions in the air flow direction.

The first and second support parts 100 and 300 may be further provided with first and second louver fins 102 and 302 in which predetermined regions corresponding to the first and second hollow parts 101 and 301 are cut, respectively, and are bent to thereby protrude, respectively.

The heat generating part 200 may use a carbon nano tube (CNT).

The heat generating part 200 may be coated on the first heat generation region A110 of the first support part 100.

The heat generating part 200 may include: a first insulating layer 211 formed in the first heat generation region A110 of the first support part 100; a pair of electrodes 212 lengthily formed in a width direction at both end portions of the first insulating layer 211 on an upper surface of the first insulating layer 211 in the height direction; a carbon nano tube heat generating layer 213 formed on the upper surface of the first insulating layer 211 so as to be conducted to the electrodes 212; and a protecting layer 214 formed on the upper surface of the first insulating layer 211 so as to enclose the electrodes 212 and the carbon nano tube heat generating layer 213.

The heat generating part 200 may use a positive temperature coefficient (PTC) element.

The heat generating part 200 may include a heat generating tube 231 including the PTC element, and the heat generating tube 231 may be adhered to the first heat generation region A110 of the first support part 100 using a thermal conductive adhesive.

The heat generating part 200 may include: the heat generating tube 231; a guide plate 232 disposed in the heat generating tube 231 and including a plurality of through-holes formed therein in a width direction; the PTC elements 220 disposed in the through-holes of the guide plate 232; and 1-1-th and 1-2-th electrodes 233 and 234 disposed at both sides of the guide plate 232, respectively, in the tube.

The heat generating part 200 may include: PTC elements 220; an insulation support body 241 formed so as to correspond to the first and second heat generation regions A110 and A310 and provided with space parts 242 hollowed so that the PTC elements 220 are seated therein; and a 2-1-th electrode 245 applying power to the PTC elements 220.

In the heat generating part 200, a surface of the insulation support body 241 corresponding to the first heat generation region A110 may be provided with a first seating part 243 so as to be stepped toward the space part 242, and the 2-1-th electrode 245 may be seated in the first seating part 243 of the insulation support body 241.

In the heat generating part 200, a surface of the insulation support body 241 corresponding to the second heat generation region A310 may be provided with a second seating part 244 so as to be stepped toward the space part 242, and a 2-2-th electrode 246 may be further seated on the second seating part 244 of the insulation support body 241.

The vehicle heater may further include a 2-1-th insulating layer 247 formed on one surface of the heat generating part 200 contacting the first support part 100 and a 2-2-th insulating layer 248 formed on the other surface of the heat generating part 200 contacting the second support part 300.

Advantageous Effects

Therefore, a vehicle heater according to the present invention may be easily manufactured and be miniaturized due to a decrease in a thickness by forming a heat generating part using a first support part (and a second support part) positioned perpendicularly to an air flow direction and having a plate form and may improve heating performance by improving heat exchange performance.

In addition, in the vehicle heater according to the present invention, a configuration is simplified, such that manufacturability may be improved, and the first support part (and second support part) may be integrally formed in a height direction, such that the manufacturability may be further secured, or the number of modules is adjusted depending on a change in the height direction in the case in which the first support part and a heat generating part (and the second support part) are formed in a module form, such that a design change may be easy.

Further, the vehicle heater according to the present invention further includes the second support part, thereby making it possible to further secure a heat generation region. The second support part supports both sides of the heat generating part together with the first support part, thereby making it possible to improve structural stability.

Here, in the vehicle heater according to the present invention, first hollow parts formed in the first support part and second hollow parts formed in the second support part are formed so as to be overlapped with each other in a predetermined region in the air flow direction to allow air to turbulently flow, thereby making it possible to improve heat exchange performance of the air.

Further, in the vehicle heater according to the present invention, first and second louver fins capable of further increasing heat exchange areas and guiding the air may be further formed, thereby making it possible to maximize the heat exchange performance.

Further, in the vehicle heater according to the present invention, in the case in which the heat generating part is formed using a carbon nano tube, components for using the carbon nano tube are directly coated on a first heat generation region of the first support part, such that the vehicle heater may be easily manufactured, a thickness of the vehicle heater may be further decreased, the vehicle heater may be easily controlled, and a problem due to overheating may be prevented, thereby making it possible to further improve safety.

Further, in the vehicle heater according to the present invention, in the case in which a heat generating tube including a PTC element is used as the heat generating part, the heat generating tube including a guide plate, the PTC element, a positive electrode plate, and a negative electrode plate is adhered to the first heat generation region of the first support part, thereby making it possible to simply manufacture the vehicle heater, and sufficient heat is generated through the first support part, thereby making it possible to prevent the problem due to the over-heating.

Furthermore, the vehicle heater according to the present invention uses the PTC element, uses the second support part as a ground terminal, and has a simple form in which it includes a 2-1-th electrode and an insulation support body, such that it may be easily manufactured.

LISTING OF THE ELEMENTS

Figure 1:
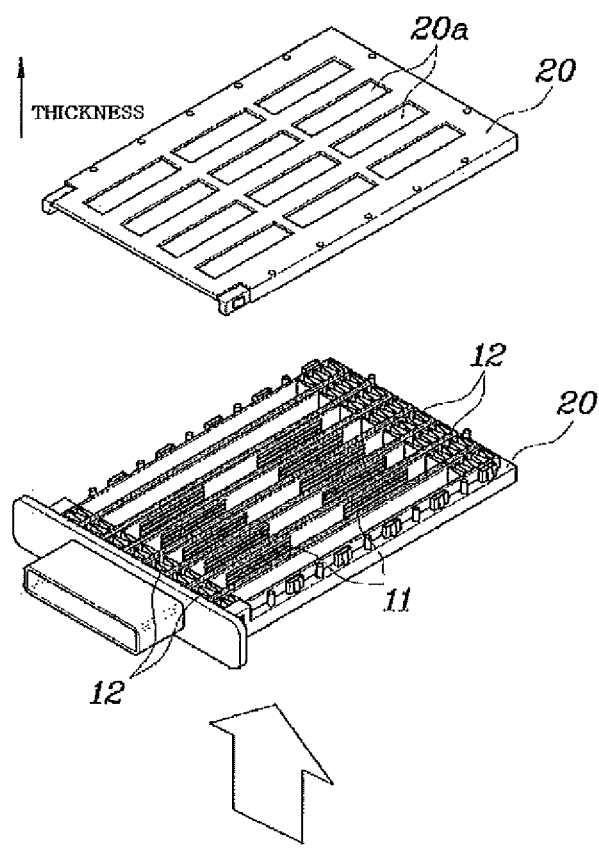
FIG. 1 is a view showing a positive temperature coefficient (PTC) heater according to the related art.
Figure 2:
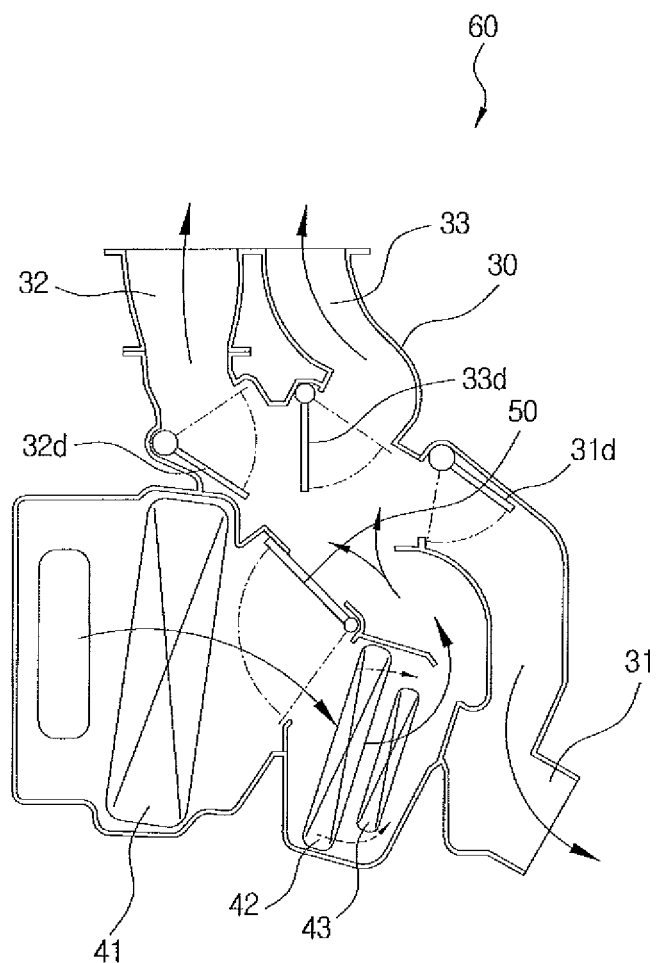
FIG. 2 is a view showing a general vehicle air conditioning apparatus.

1000: Vehicle heater
100: First support part
101: First hollow part
102: First louver fin
A110: First heat generation region
A120: First air flowing region
200: Heat generating part
211: First insulating layer
212: Electrode
213: Carbon nano tube heat generating layer
214: Protecting layer
220: PTC element
231: Heat generating tube
232: Guide plate
233: 1-1-th electrode
234: 1-2-th electrode
241: Insulation support body
242: Space part
243: First seating part
244: Second seating part
245: 2-1-th electrode
245a: First bent part
246: 2-2-th electrode
246a: Second bent part
247: 2-1-th insulating layer
248: 2-2-th insulating layer
300: Second support part
301: Second hollow part
302: Second Louver fin
A310: Second heat generation region
A320: Second air flowing region
400: Housing
500: Air conditioning case
510: Floor vent
510d: Floor vent door
520: Defrost vent
520d: Defrost vent door
530: Face vent
530d: Face vent door
600: Temp door
700: Evaporator
2000: Heater core

DETAILED DESCRIPTION OF THE INVENTION

Hereinafter, a vehicle heater 1000 according to the present invention having the above-mentioned characteristics will be described in more detail with reference to the accompanying drawings.

The vehicle heater 1000 according to the present invention, which is a means heat-exchanged with a flowing fluid (air) to heat the fluid, is configured to include a first support part 100, a heat generating part 200, and a housing 400.

The first support part 100 has a plate form, is positioned perpendicularly to an air flow direction, and includes a first heat generation region A110 and a first air flowing region A120.

Figure 3:
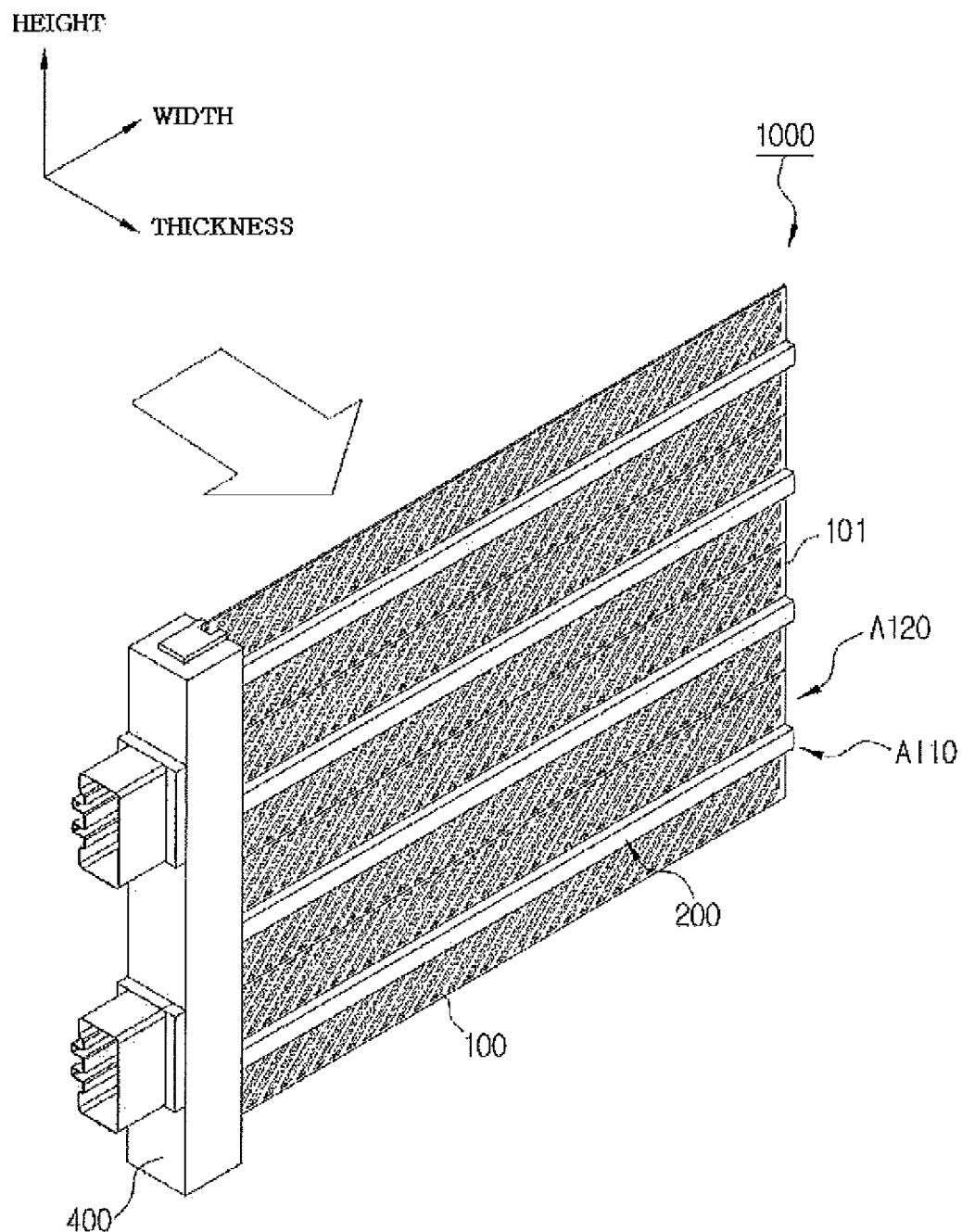
FIGS. 3 and 4 are, respectively, a perspective view and an exploded perspective view of a vehicle heater according to the present invention.

In the present invention, the air flow direction is denoted by an arrow in FIG. 3 and is defined as the same meaning as a thickness direction.

That is, a predetermined region of the first support part 100 forms the first heat generation region A110 corresponding to a region in which the heat generating part 200 is positioned, and the remaining region forms the first air flowing region A120 in which the air flows.

The first air flowing region A120 is provided with a plurality of first hollow parts 101 in which predetermined regions are hollowed in the remaining region of the first heat generation region A110. Forms and the number of first hollow parts 101 and a form of the first support part 100 may be various, which will be again described below.

The heat generating part 200, which is a component generating heat, is formed in the first heat generation region A110 of the first support part 100, and is a component performing heating of the vehicle heater 1000 according to the present invention.

The heat generating parts 200 may be variously formed, which will be again described below.

The housing 400, which is a component supporting and fixing one end portions of the first support part 100 and the heat generating part 200, has components embedded therein in order to apply power to the heat generating part 200.

In the vehicle heater 1000 according to the present invention, the first support part 100 having the plate form that is simple is used, thereby making it possible to simplify a configuration as compared with the case of using a fin form according to the related art, and the heat generating part 200 is disposed in the first heat generation region A110 to decrease an entire thickness of the vehicle heater, such that the vehicle heater may be miniaturized.

Figure 4:
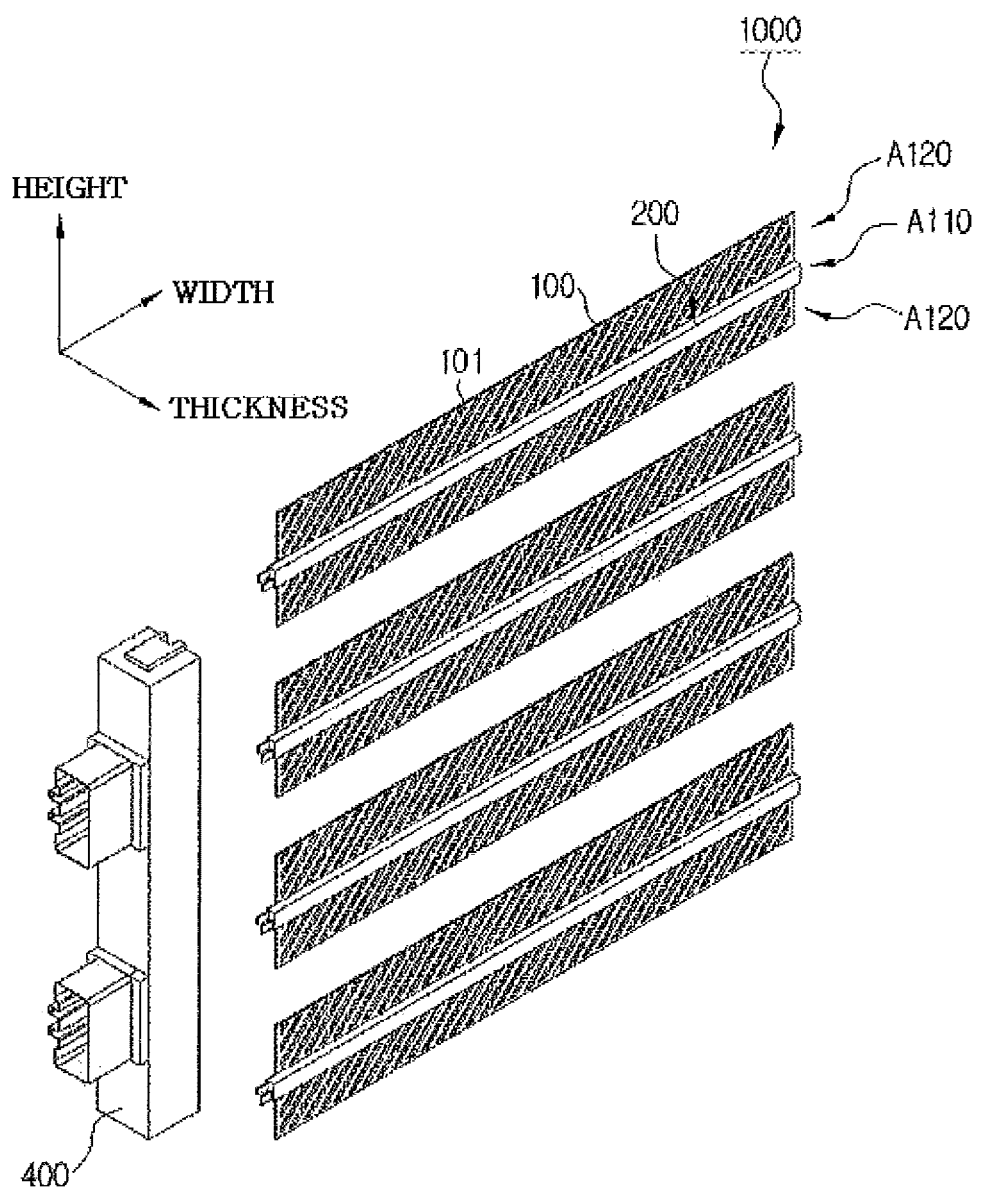

A form shown in FIGS. 3 and 4 shows an example in which one first support part 100 is provided with one first heat generation region A110 and the first air flowing regions A120 formed at both sides of the first heat generation region A110 and having the plurality of first hollow parts 101 formed therein and four first support parts 100 having the heat generating parts 200 as described above formed in a height direction are formed in the height direction.

The present invention is not limited thereto. One or more first heat generation regions A110 may be formed in the first support part 100, and forms of the first hollow parts 101 of the first air flowing region A120 may be variously formed.

In addition, in the vehicle heater 1000 according to the present invention, a single first support part 100 may be formed, and a plurality of first heat generation regions A110 and a plurality of first air flowing regions A120 may be formed in the single first support part 100.

Figure 5:
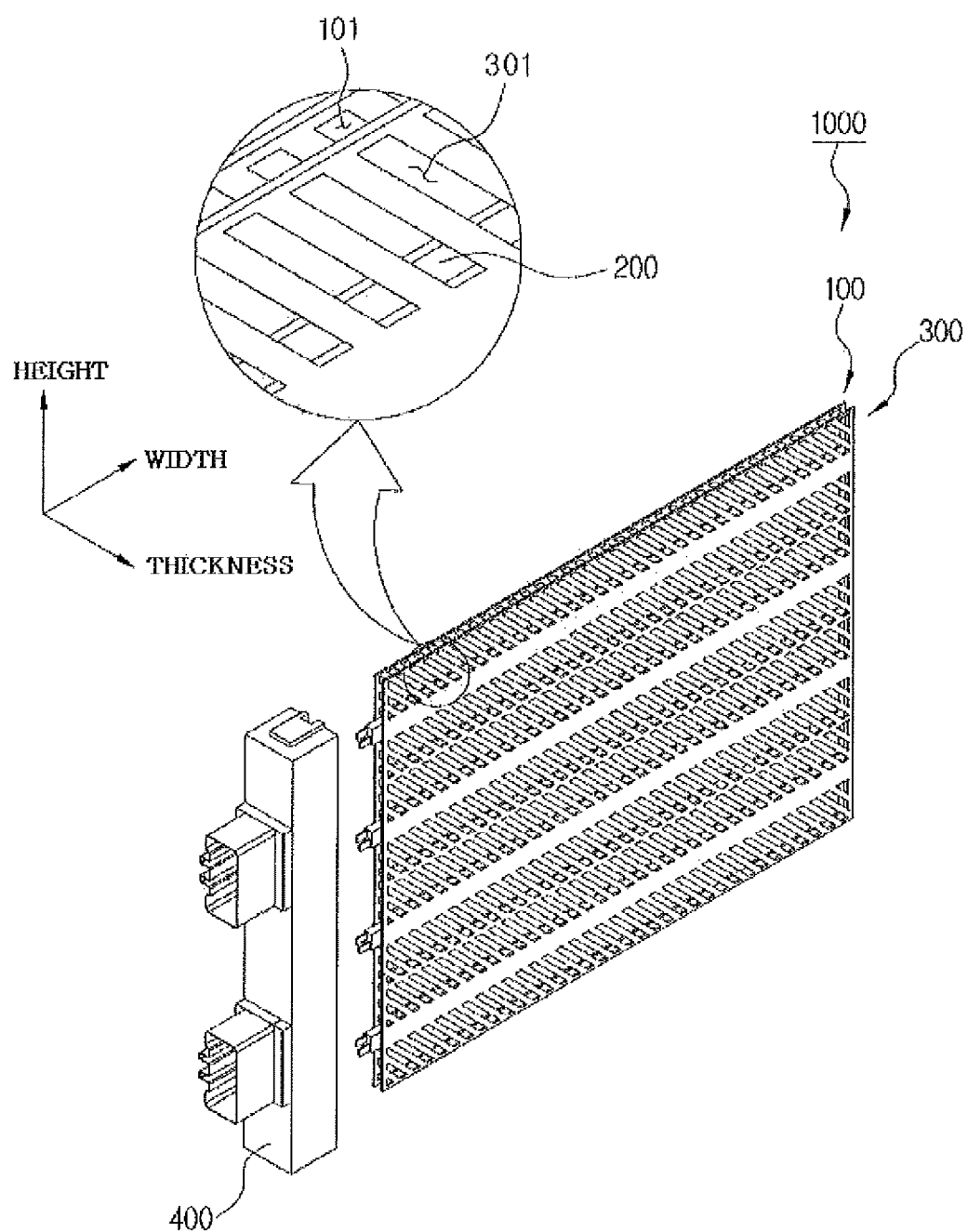
FIG. 5 is another perspective view of a vehicle heater according to the present invention.

An example in which the single first support part 100 is formed is shown in FIG. 5. Here, FIG. 5 shows an example in which a second support part 300 is further formed.

As shown in FIG. 5, the vehicle heater 1000 according to the present invention may further include the second support part 300 supporting both sides of the heat generating part 200 together with the first support part 100.

The second support part 300 is formed in a plate form, similar to the first support part 100, and includes a second heat generation region A310 corresponding to the first heat generation region A110 and a second air flowing region A320 corresponding to the first air flowing region A120.

In more detail, the second support part 300 includes the second heat generation region A310 corresponding to the first heat generation region A110 of the first support part 100 and supporting the heat generating part 200 and the second air flowing region A320 adjacent to the second heat generation region A310, provided with a plurality of second hollow parts 301 in which predetermined regions are hollowed, and corresponding to the first air flowing region A120 of the first support part 100.

Here, the second support part 300 may have an entire form that is the same as that of the first support part 100, as shown in FIG. 5. Alternatively, the second hollow parts 301 may have a form that is different from that of the first hollow parts 101 of the first support part 100 so as to control an air flow, as shown in FIGS. 6 and 7.

Figure 6:
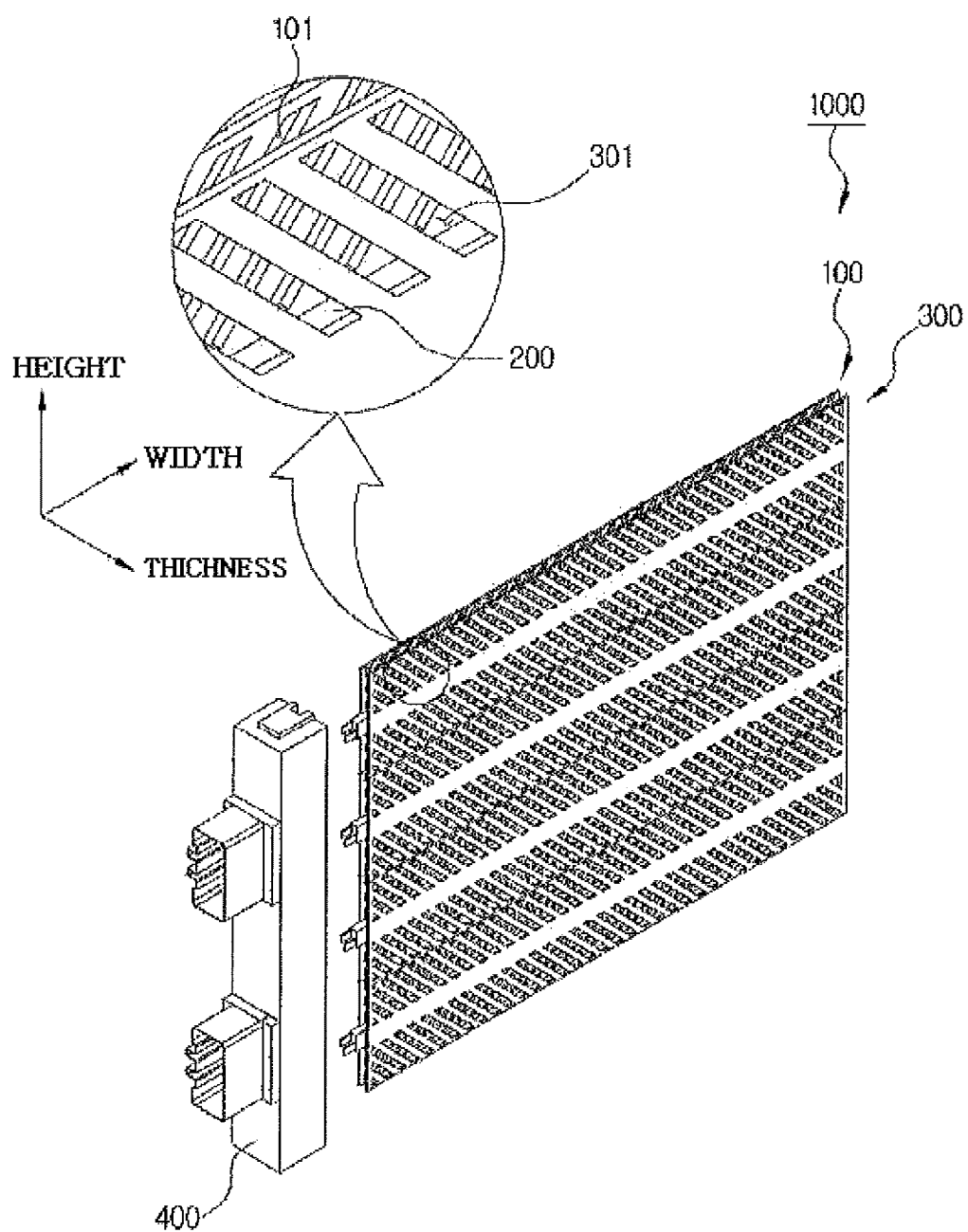
FIG. 6 is still another perspective view of a vehicle heater according to the present invention.
Figure 7:
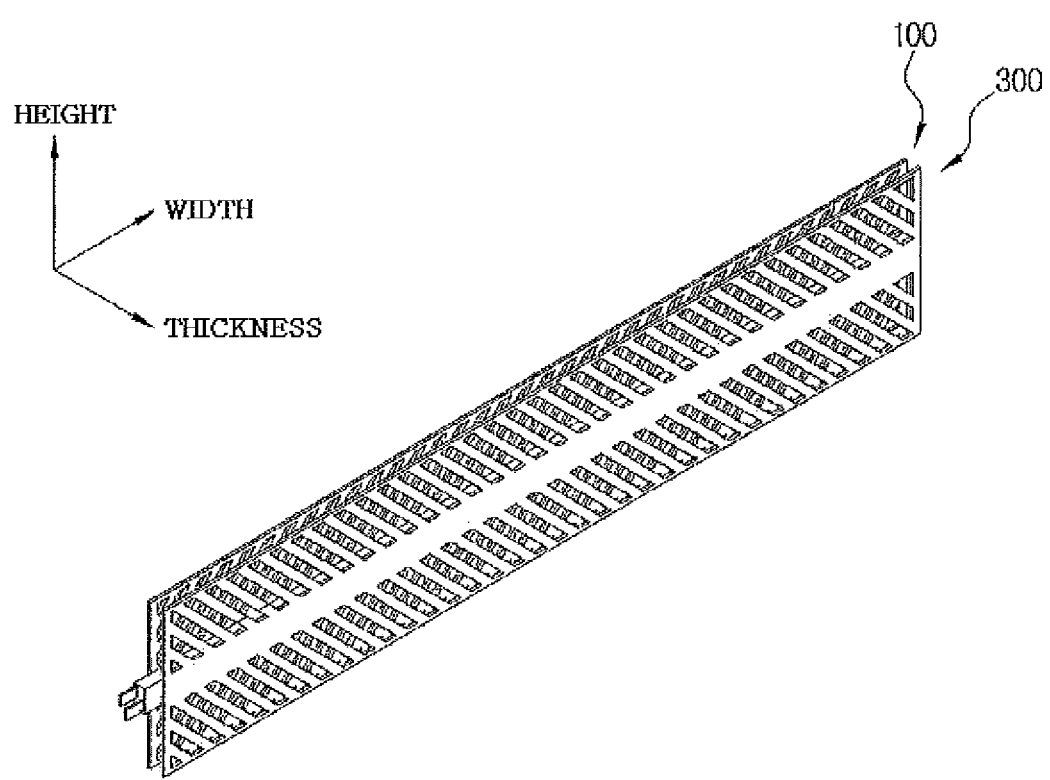
FIG. 7 is a perspective view showing a module of a first support part, a heat generating part, and a second support part of the vehicle heater shown in FIG. 6.

A form shown in FIGS. 6 and 7, which shows an example in which the first hollow parts 101 of the first support part 100 and the second hollow parts 301 of the second support part 300 are formed so as to be inclined by predetermined angles in a width direction and are inclined at different angles, shows an example in which only predetermined regions in regions of the first and second hollow parts 101 and 301 are formed so as to correspond to (be overlapped with) each other in the air flow direction.

That is, in a form shown in FIGS. 6 and 7, some of air passing through the first hollow parts 101 of the first support part 100 is directly discharged through the second hollow parts 301 of the second support part 300, and the others collide with a plate region of the second support part 300 to turbulently flow and be then discharged.

The vehicle heater 1000 according to the present invention shown in FIGS. 6 and 7 allows the air to turbulently flow, thereby making it possible to further increase a heat exchange time between the air and the heat generating part 200. Therefore, heat exchange performance may be further improved.

Meanwhile, in a form in which the second support part 300 is further included, it is preferable that in the case in which the first support part 100 is integrally formed, the second support part 300 is integrally formed, similar to the first support part 100.

In addition, it is preferable that in the case in which the first support part 100 is formed in a module form, the second support part 300 is also formed at a size corresponding to that of the first support part 100 to form a module together with the first support part 100 (See FIGS. 6 and 7).

Figure 8A:
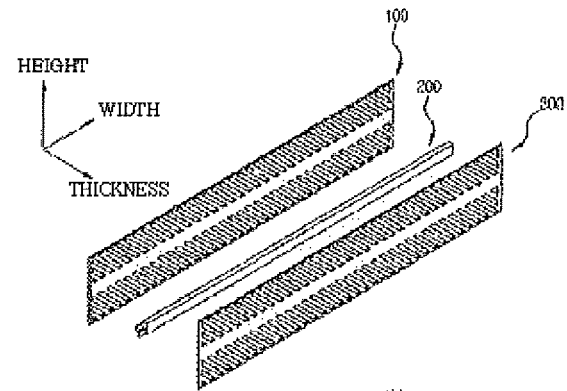
FIGS. 8A to 8C are views showing various examples of a module of a first support part, a heat generating part, and a second support part of the vehicle heater according to the present invention.
Figure 8B:
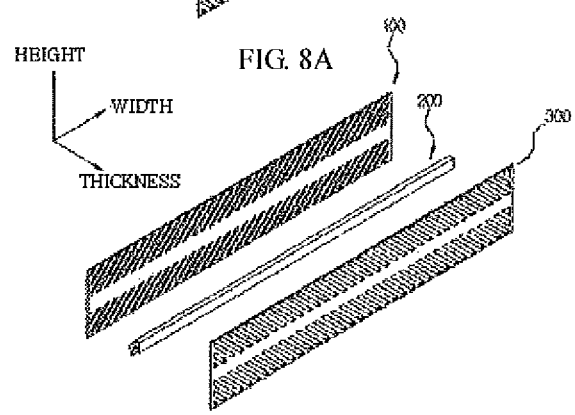
Figure 8C:
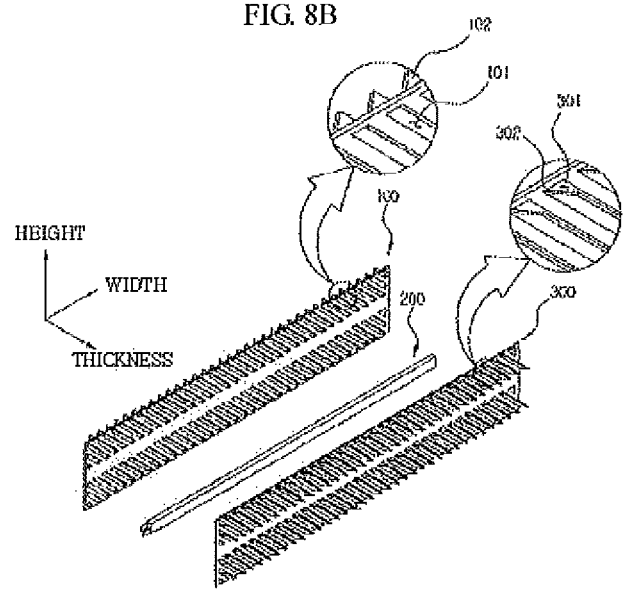

FIGS. 8A to 8C show various examples in which the first support part 100, the heat generating part 200, and the second support part 300 are formed in a module form. FIG. 8A shows an example in which the first and second support parts 100 and 300 are formed in the same form and the first and second hollow parts 101 and 301 are formed so as to be inclined by a predetermined angle in the width direction.

FIG. 8B shows an example in which the first and second support parts 100 and 300 have a similar form and the first and second hollow parts 101 and 301 are formed so as to be overlapped with each other only in predetermined regions, and FIG. 8C shows an example in which a form is the same as the form shown in FIG. 8A and first and second louver fins 102 and 302 are formed in the first and second hollow parts 101 and 301 of the first and second support parts 100 and 300, respectively.

The first and second louver fins 102 and 302 are portions in which predetermined regions corresponding to the first and second hollow parts 101 and 301 are cut, respectively, and are bent to thereby protrude.

That is, the first and second louver fins 102 and 302, which are components formed integrally with the first and second support parts 100 and 300, have a form in which they are extended from the first and second hollow parts 101 and 301, respectively.

The first and second louver fins 102 and 302 may be simply formed by cutting only portions other than specific portions and adding only a process of bending the specific portions connected to the first and second support parts 100 and 300 in a process of forming the first and second hollow parts 101 and 301.

In other words, in the vehicle heater 1000 according to the present invention, the first and second louver fins 102 and 302 are formed using regions that are removed in order to form the first and second hollow parts 101 and 301, such that they may be manufactured in a simple method and may further increase a contact area with the air. Therefore, entire heat exchange performance may be improved.

In FIG. 8C, an example in which the first louver fins 102 of the first support part 100 protrude rearward on the drawing in a thickness direction and the second louver fins 302 of the second support part 300 protrude forward on the drawing in the thickness direction is shown.

The vehicle heater 1000 according to the present invention is not limited thereto. That is, the first and second louver fins 102 and 302 may protrude in the same direction. Here, the first and second louver fins 102 and 302 may also protrude so as to be bent in an opposite direction to a coupling direction with the heat exchanger in parallel with the air flow direction.

The heat generating part 200 may use forms in which heat is generated by various methods. As a detailed example, a carbon nano tube may be used as shown in FIG. 9 and a positive temperature coefficient (PTC) element 220 may be used as shown in FIGS. 10 to 16.

The heat generating part 200 using the carbon nano tube will be described with reference to FIG. 9. Components for using the carbon nano tube may be directly coated and formed on the first heat generation region A110 of the first support part 100.

In more detail, the heat generating part 200 using the carbon nano tube is configured to include a first insulating layer 211 formed in the first heat generation region A110 of the first support part 100, a pair of electrodes 212 lengthily formed in the width direction at both end portions of the first insulating layer 211 on an upper surface of the first insulating layer 211 in the height direction, a carbon nano tube heat generating layer 213 formed on the upper surface of the first insulating layer 211 so as to be conducted to the electrodes 212, and a protecting layer 214 formed on the upper surface of the first insulating layer 211 so as to enclose the electrodes 212 and the carbon nano tube heat generating layer 213.

Figure 9:
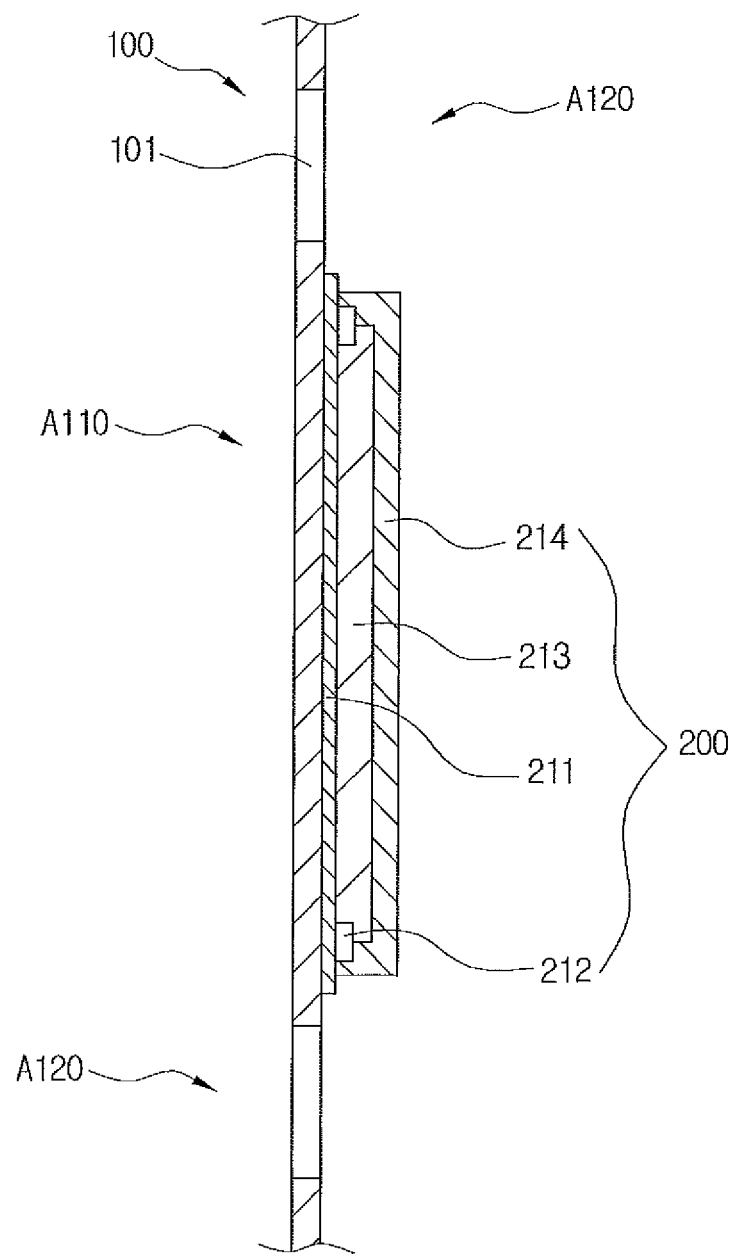
FIG. 9 is a view showing an example (CNT) of a heat generating part of the vehicle heater according to the present invention.

In a form shown in FIG. 9, the components for using the carbon nano tube are directly coated on the first support part 100, thereby making it possible to secure sufficient durability and further secure manufacturability.

The vehicle heater 1000 according to the present invention shown in FIG. 9 has a form in which it includes the first support part 100 and the heat generating part 200 and may further include the second support part 300.

Figure 10:
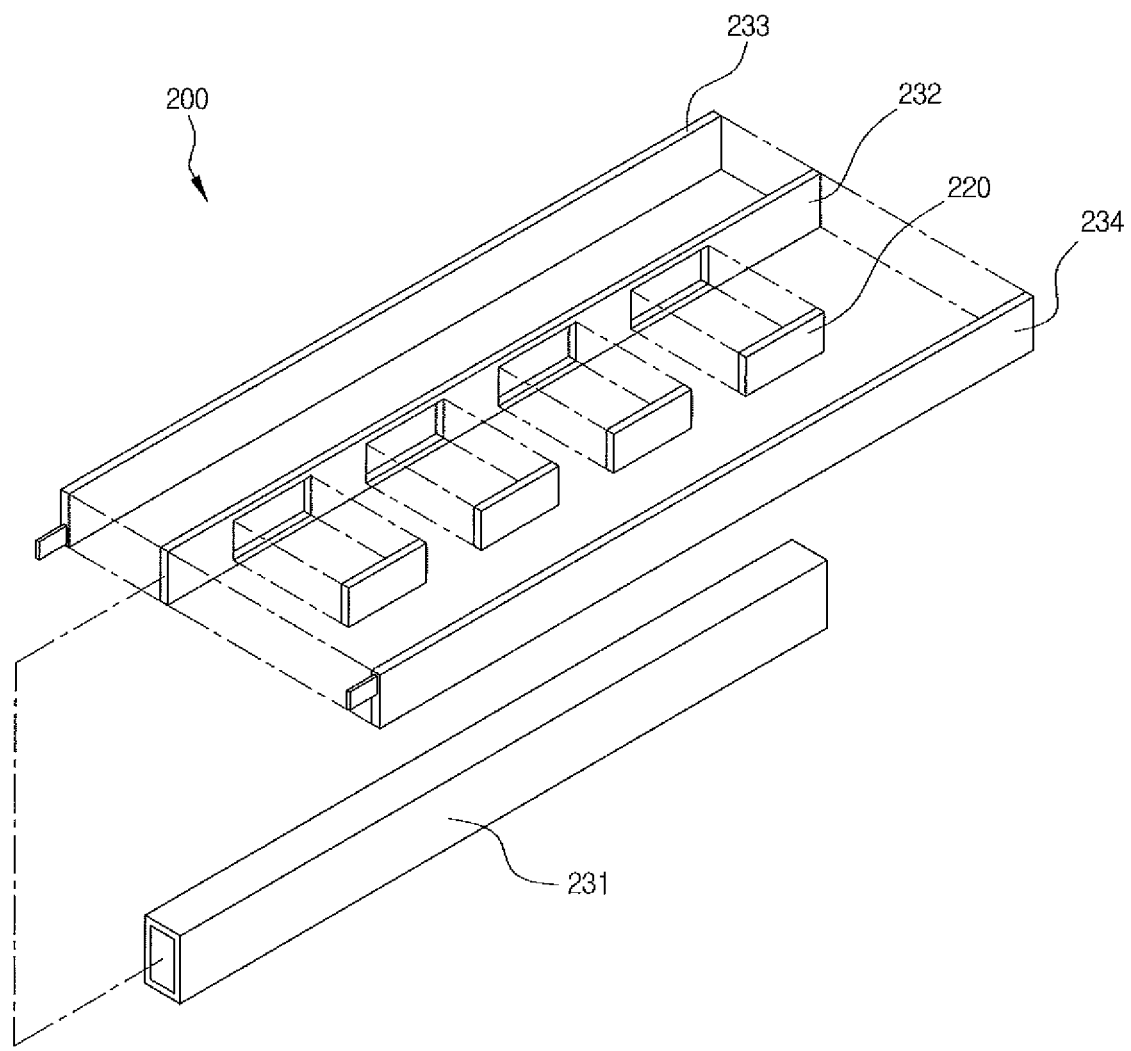
FIG. 10 is a view showing another example (PTC) of a heat generating part of the vehicle heater according to the present invention.

FIGS. 10 to 16 are views showing various examples of the heat generating part 200 using the PTC element 220, wherein FIG. 10 shows a form in which a heat generating tube 231 including the PTC element 220 is used and FIGS. 11 to 16 show a form in which the heat generating tube 231 is not used.

The heat generating part 200 using the heat generating tube 231 including the PTC element 220 will be described with reference to FIG. 10.

In the heat generating part 200 shown in FIG. 10, the heat generating tube 231 may be adhered to the first heat generation region A110 of the first support part 100 using a thermal conductive adhesive.

Here, the heat generating part 200 is configured to include the heat generating tube 231, a guide plate 232 disposed in the heat generating tube 231 and including a plurality of through-holes formed therein in the width direction, the PTC elements 220 disposed in the through-holes of the guide plate 232, and 1-1-th and 1-2-th electrodes 233 and 234 disposed at both sides of the guide plate 232, respectively, in the tube.

FIG. 10 shows the heat generating part 200, and the vehicle heater 1000 according to the present invention may be applied to both of a form in which the first support part 100 is included and a form in which the first and second support parts 100 and 300 are included.

Figure 11:
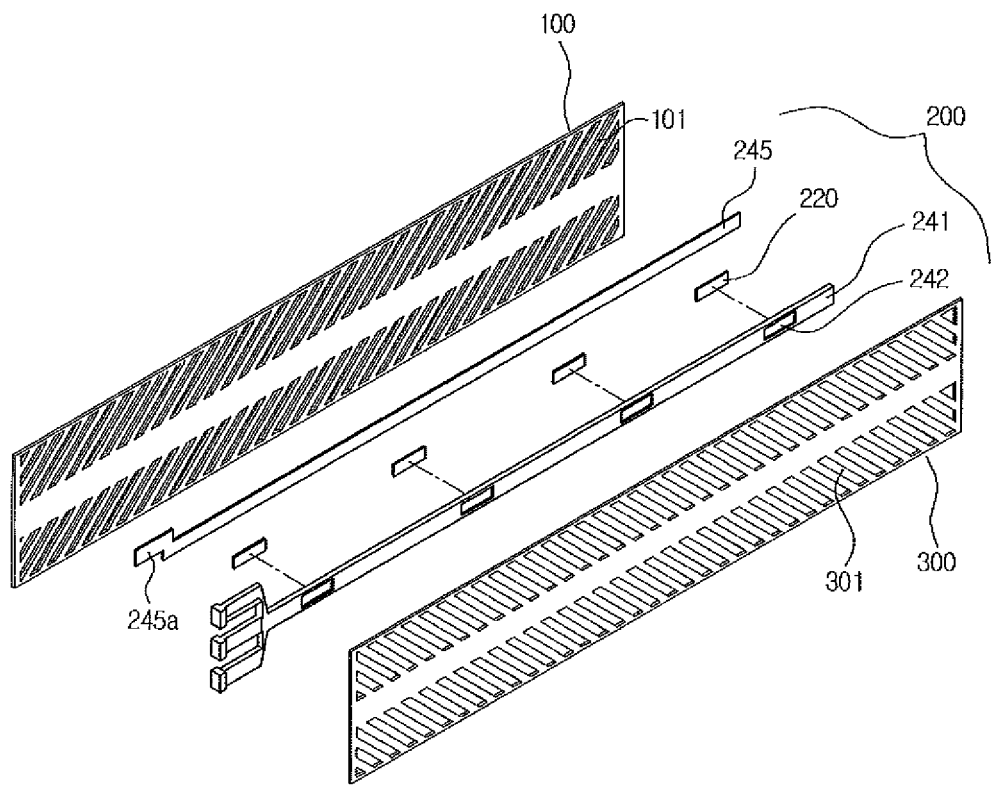
FIGS. 11 and 12 are, respectively, an exploded perspective view and a cross-sectional view of the vehicle heater according to the present invention.
Figure 12:
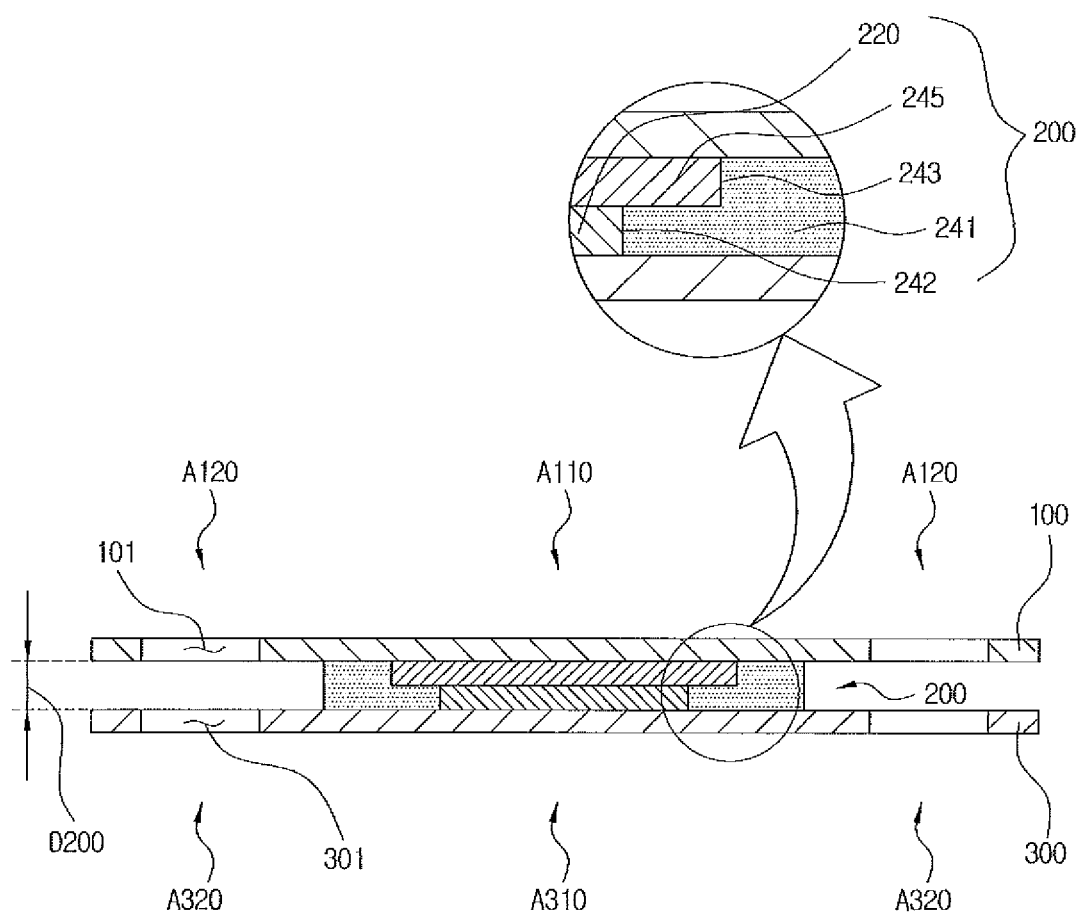

The heat generating part 200 shown in FIGS. 11 and 12 is disposed in the first heat generation region A110 of the first support part 100 and the second heat generation region A310 of the second support part 230.

Here, the heat generating part 200 is configured to include the PTC elements 220, an insulation support body 241, and a 2-1-th electrode 245.

The insulation support body 241 is a basic body forming the heat generating part 200, and predetermined regions of both sides of the insulation support body 241 contact the first and second heat generation regions A110 and A310 of the first and second support parts 100 and 300, respectively.

The insulation support body 241 is provided with space parts 242 hollowed so that the PTC elements 220 are seated therein.

The heat generating part 200 as shown in FIGS. 11 and 12, which is formed so as to directly contact the PTC elements 220 using the second support part 300 as a ground terminal, is an example that may be implemented in a state in which safety is secured.

In addition, in the vehicle heater 1000 according to the present invention, a surface corresponding to the first heat generation region A110 of the first support part 100 is formed so as to be stepped toward the space part 242, such that a first seating part 243 in which the 2-1-th electrode 245 is seated may be formed.

That is, the insulation support body 241 has one side contacting the first heat generation region A110 of the first support part 100 together with the 2-1-th electrode 245 and the other side contacting the second heat generation region A310 of the second support part 300 together with the PTC element 220.

To this end, the heat generating part 200 is formed so that a thickness of the 2-1-th electrode 245 and a depth of the first seating part 243 correspond to each other and a height of the space part 242 and a thickness of the PTC element 220 correspond to each other.

Figure 13:
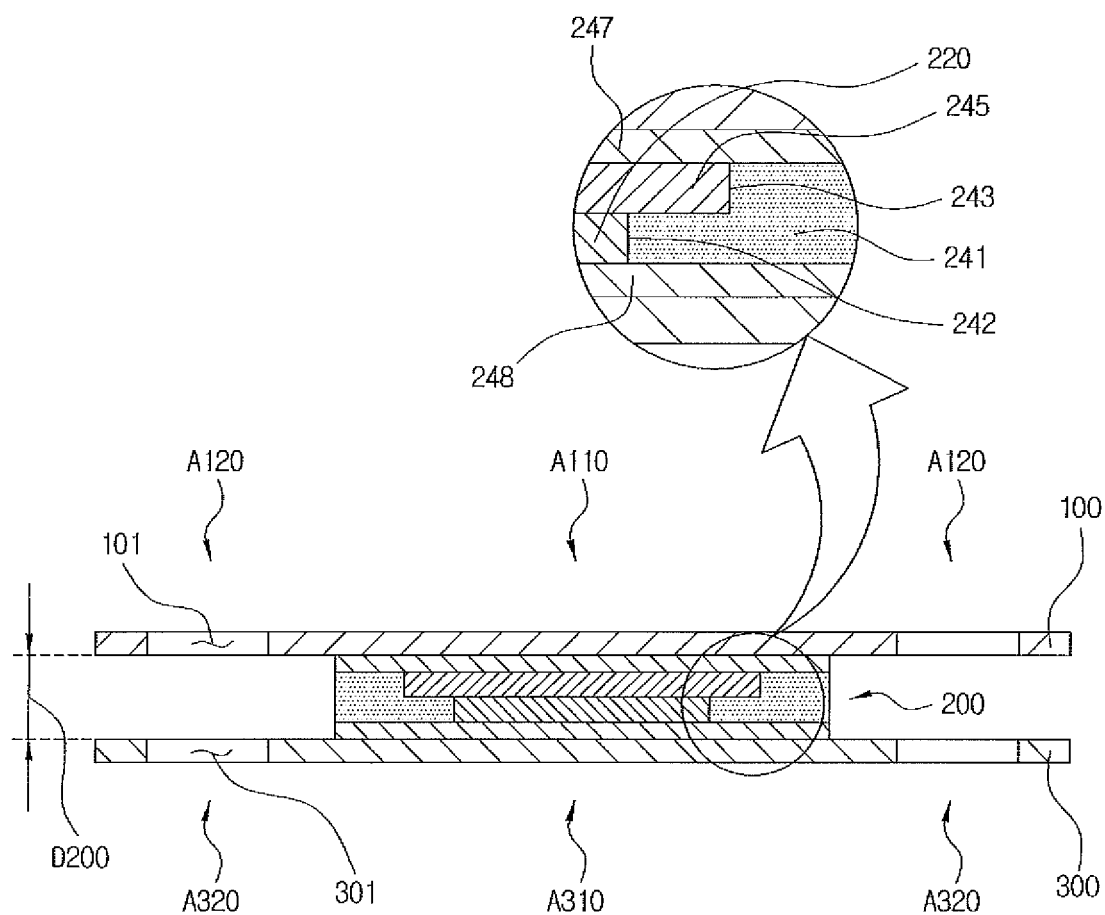
FIG. 13 is another cross-sectional view of the vehicle heater according to the present invention.

FIG. 13, which shows an example in which another heat generating part 200 of the vehicle heater 1000 according to the present invention is formed, shows an example in which 2-1-th and 2-2-th insulating layers 247 and 248 are further formed, respectively, on both sides of the heat generating part 200 contacting the first and second support parts 100 and 300.

Figure 14:
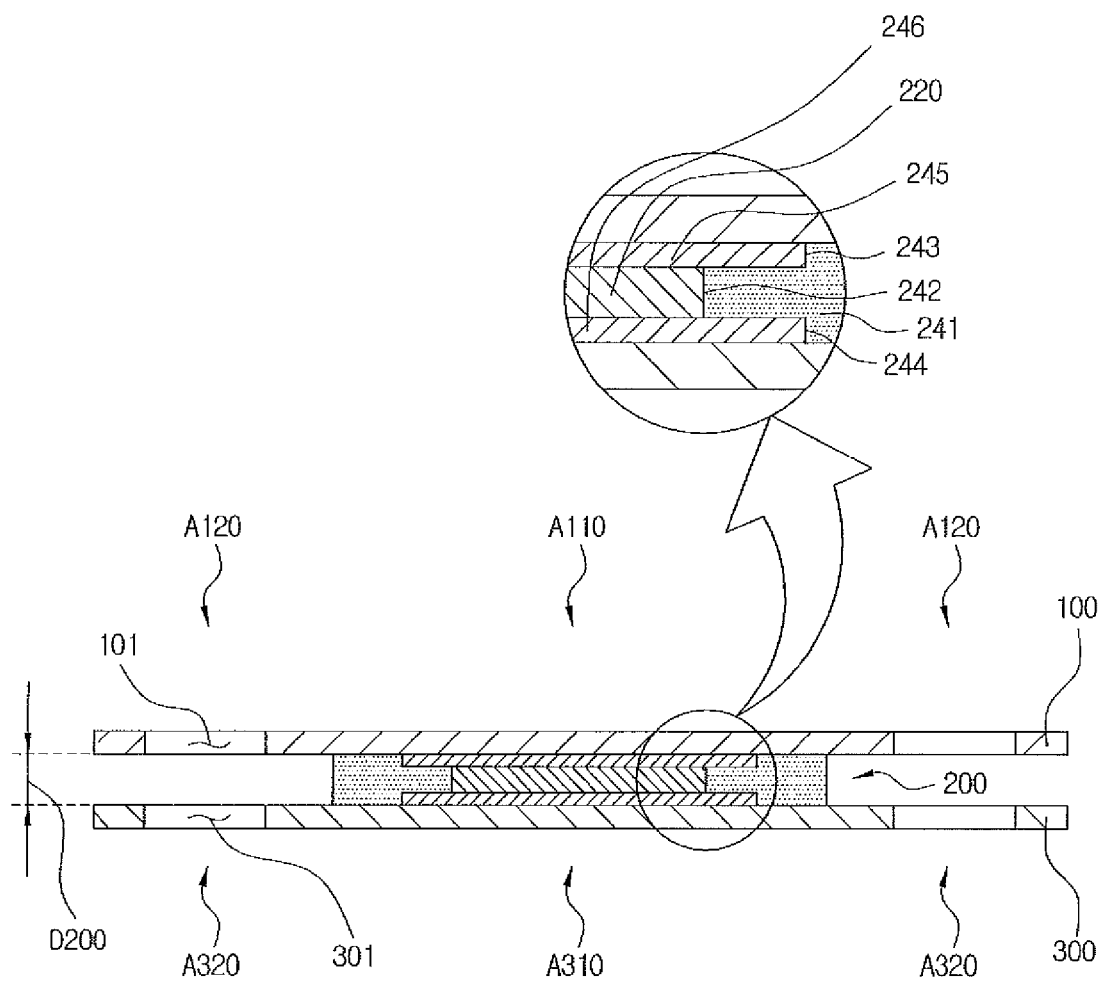
FIG. 14 is still another cross-sectional view of the vehicle heater according to the present invention.

FIG. 14, which shows an example in which still another heat generating part 200 of the vehicle heater 1000 according to the present invention is formed, shows an example in which a surface of the insulation support body 241 corresponding to the second heat generation region A310 is provided with a second seating part 244 formed so as to be stepped toward the space part 242, and a 2-2-th electrode 246 is further seated in the second seating part 244 of the insulation support body 241.

In the case in which the 2-2-th electrode 246 is provided, a thickness of the 2-2-th electrode 246 and a depth of the second seating part 244 correspond to each other so that the other surface of the insulation support body 241 contacts the second heat generation region A310 of the second support part 300 together with the 2-2-th electrode 246.

In the case in which the 2-1-th electrode 245 and the 2-2-th electrode 246 are provided, first and second bent parts 245a and 246a bent in different directions may be formed so that electrical connection within the housing 400 is easy.

Here, the insulation support body 241 is formed in a form in which it may support the 2-1-th electrode 245 provided with the first bent part 245a and the 2-2-th electrode 246 provided with the second bent part 246a.

Figure 15:
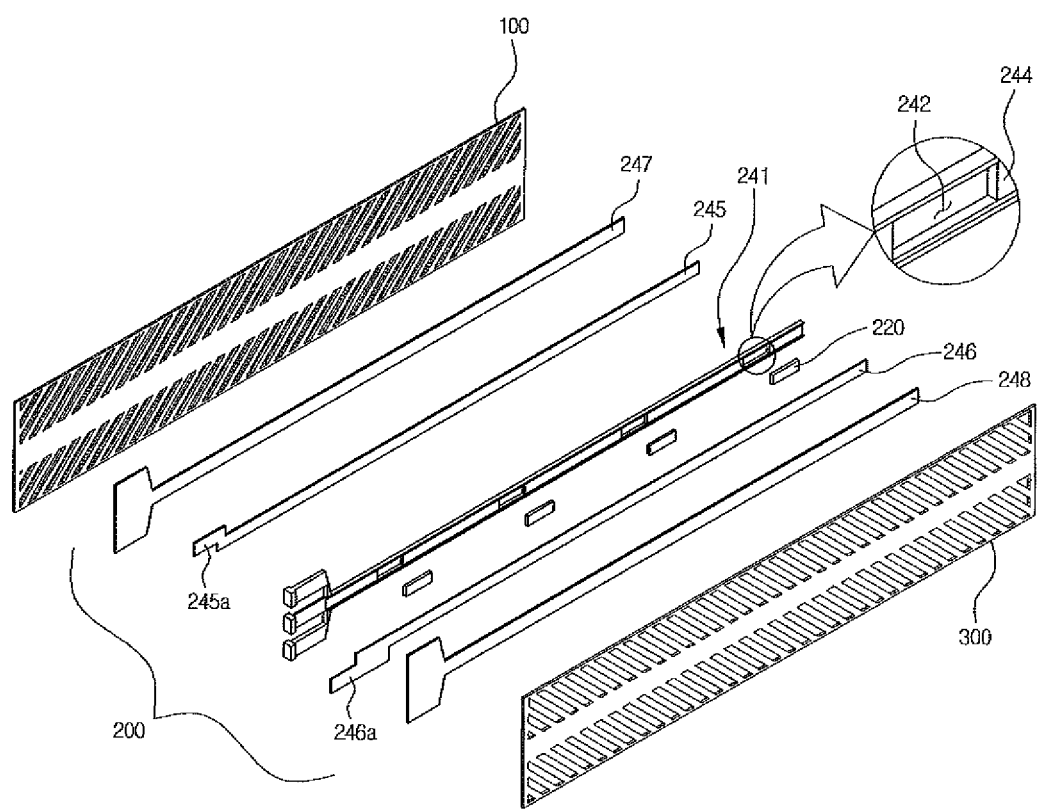
FIGS. 15 and 16 are, respectively, still another exploded perspective view and cross-sectional view of the vehicle heater according to the present invention.
Figure 16:
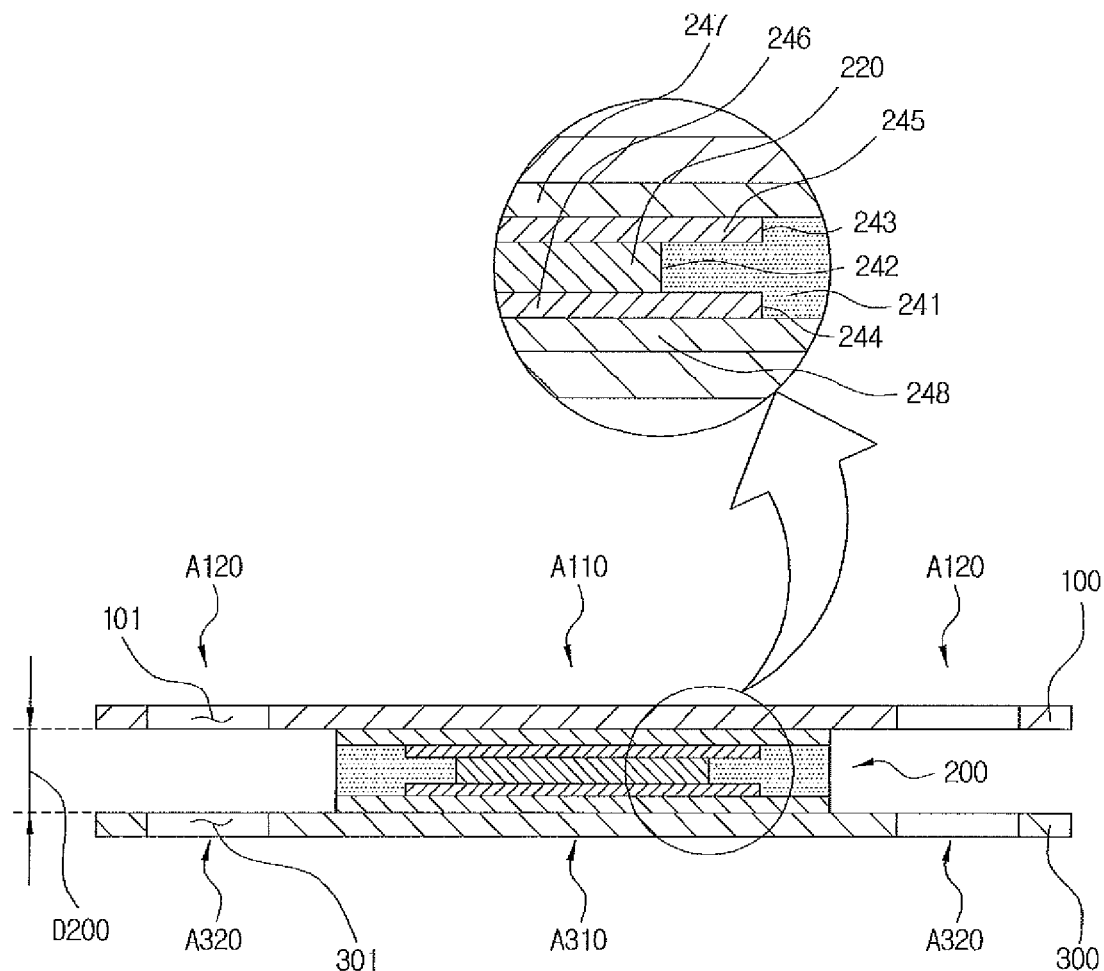

FIGS. 15 and 16, which are, respectively, an exploded perspective view and a cross-sectional view showing still another example of the vehicle heater 1000 according to the present invention, show an example in which 2-1-th and 2-2-th insulating layers 247 and 248 are further formed, respectively, on surfaces of the heat generating part 200 shown in FIG. 14, contacting the first and second support parts 100 and 300.

In addition, it is preferable that in the case in which the 2-1-th and 2-2-th electrodes 245 and 246 are provided together with each other, a first bent part 245a, which is an end portion of the 2-1-th electrode 245, and a second bent part 246a, which is an end portion of the 2-2-th electrode 246, are formed so as to be stepped in different directions to facilitate power supply connection.

Here, FIGS. 11 and 15, which show an example in which the first hollow parts 101 of the first support part 100 and the second hollow parts 301 of the second support part 300 are formed so as to be inclined by predetermined angles, respectively, and are inclined at different angles, show an example in which only predetermined regions in regions of the first and second hollow parts 101 and 301 are formed so as to correspond to (be overlapped with) each other in the air flow direction (width direction shown in the accompanying drawings).

The heat generating part 200 shown in FIGS. 11 to 16 has a form in which the heat generating tube 231 is not used and has an advantage that it may have a thickness D200 further decreased as compared with the heat generating part 200 shown in FIG. 10.

That is, the vehicle heater 1000 according to the present invention may have a thickness decreased in the width direction (air flow direction) and use the first and second support parts 100 and 200, thereby making it possible to simplify a configuration and decrease a weight.

Figure 17:
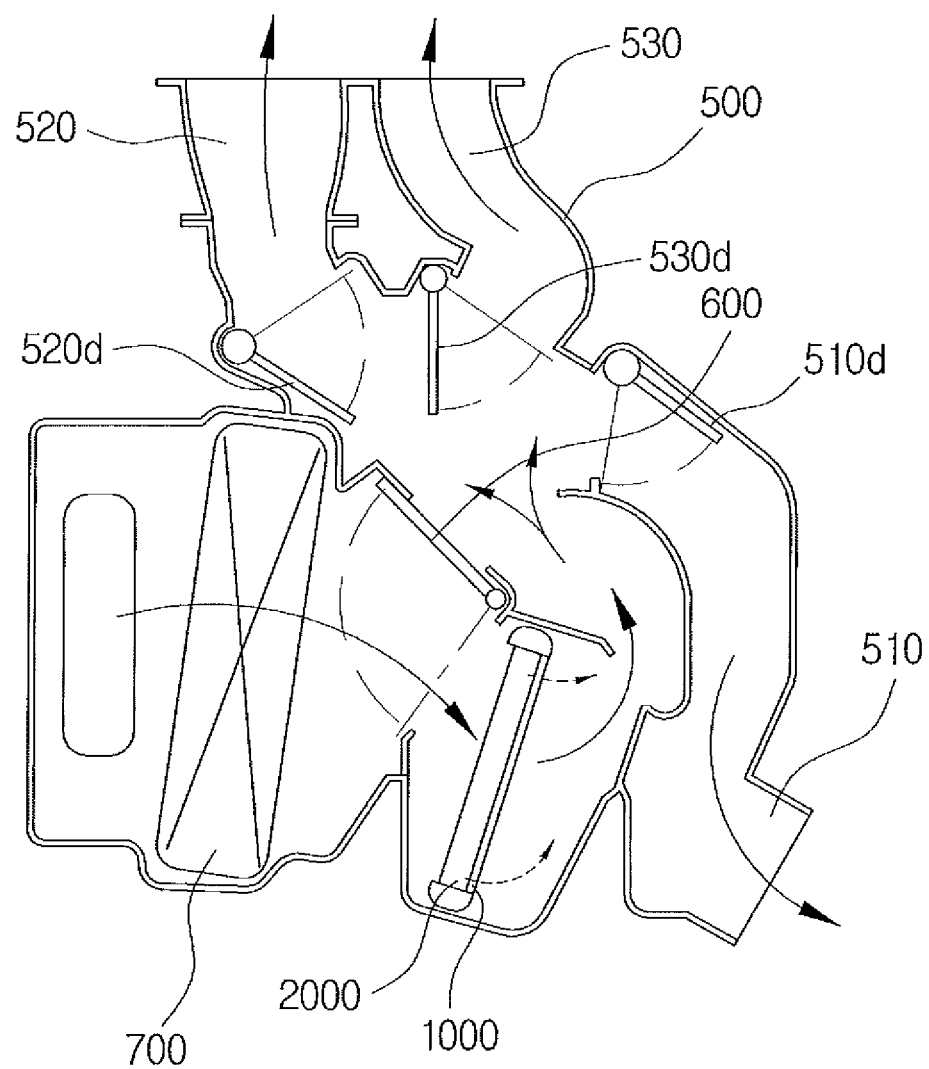
FIG. 17 is a schematic view showing a vehicle air conditioning apparatus including the vehicle heater according to the present invention.

FIG. 17 shows an air conditioning apparatus using the vehicle heater 1000 according to the present invention.

The vehicle air conditioning apparatus shown in FIG. 17 is configured to include an air conditioning case 500 provided with a floor vent 510, a defrost vent 520, and a face vent 530 of which opening degrees are adjusted by the respective doors 510d, 520d, and 530d; an evaporator 700 disposed in the air conditioning case 500 and cooling air; a heater core 2000 disposed in the air conditioning case 500 and heating the air; a temp door 600 adjusting opening degrees of a cold air path and a warm air path, and the vehicle heater 1000 according to the present invention disposed behind the heater core 2000.

In the case in which the vehicle heater 1000 heats the air together with the heater core 2000, heating performance may be further secured, and miniaturization may be possible.

In other words, the vehicle heater 1000 according to the present invention may be easily manufactured and be miniaturized due to the decrease in the thickness by forming the heat generating part 200 using the first support part 100 (and the second support part 300) positioned perpendicularly to the air flow direction and having the plate form and may improve the heating performance by improving the heat exchange performance.

The present invention is not limited to the above-mentioned exemplary embodiments, and may be variously applied, and may be variously modified without departing from the gist of the present invention claimed in the claims.

The invention claimed is:

1. A vehicle heater comprising:
a first support part positioned substantially perpendicular to a direction of a flow of air through the vehicle heater, the first support part having a plate form and including a first heat generation region and a first air flowing region, the first air flowing region having a plurality of first holes;
a heat generating part fixed to the first heat generation region of the first support part and configured to generate heat, the heat generating part including:
a plurality of positive temperature coefficient elements;
an insulation support body formed to correspond to the first heat generation region and a second heat generation region, the insulation support body having space parts for receiving the positive temperature coefficient elements; and
a 2-1-th electrode supplying power to the positive temperature coefficient elements;
a second support part including the second heat generation region corresponding to the first heat generation region of the first support part and a second air flowing region corresponding to the first air flowing region of the first support part and adjacent the second heat generation region, the second air flowing region having a plurality of second holes, the second support part cooperating with the first support part to support opposing sides of the heat generating part;
a housing supporting and fixed to one end portion of the first support part and one end portion of the heat generating part;
a 2-1-th insulating layer formed on one surface of the heat generating part and contacting the first support part; and
a 2-2-th insulating layer formed on an other surface of the heat generating part and contacting the second support part.

2. The vehicle heater of claim 1, wherein the first support part includes a plurality of first support parts and the heat generating part includes a plurality of heat generating parts, the plurality of first support parts and the plurality of heat generating parts formed in a module form.

3. The vehicle heater of claim 1, wherein the first support part is provided with a plurality of first heat generation regions and a plurality of first air flowing regions, the first heat generation regions and the first air flowing regions formed in a longitudinal direction.

4. The vehicle heater of claim 1, wherein predetermined regions of the first holes overlap predetermined regions of the second holes.

5. The vehicle heater of claim 1, wherein the first support part includes a plurality of first louver fins and the second support part includes a plurality of second louver fins, wherein the first louver fins have a shape corresponding to the first holes and the second louver fins have a shape corresponding to the second holes, the first louver fins formed from cut and bent portions of the first support part, the second louver fins formed from cut and bent portions of the second support part, and the first louver fins extending outwardly from the first support part adjacent the first holes and the second louver fins extending outwardly from the second support part adjacent the second holes.

6. The vehicle heater of claim 1, wherein a surface of the insulation support body corresponding to the first heat generation region includes a first seating part, and the 2-1-th electrode is seated in the first seating part.

7. The vehicle heater of claim 6, wherein a surface of the insulation support body corresponding to the second heat generation region includes a second seating part, and a 2-2-th electrode is seated in the second seating part.

\* \* \* \* \*